June 4, 1963  R. A. RIGHTMIRE  3,092,516
ELECTROCHEMICAL REACTION APPARATUS
Filed May 6, 1960

INVENTOR.
Robert A. Rightmire
BY
Cramer & Stanger
ATTORNEYS.

United States Patent Office 3,092,516
Patented June 4, 1963

---

3,092,516
ELECTROCHEMICAL REACTION APPARATUS
Robert A. Rightmire, Twinsburg, Ohio, assignor to The Standard Oil Company, Cleveland, Ohio, a corporation of Ohio
Filed May 6, 1960, Ser. No. 27,453
9 Claims. (Cl. 136—86)

This invention relates generally to the direct conversion of one form of energy to another and more particularly relates to an apparatus and method for accomplishing such direct conversion electrochemically. The principles of the invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy is accomplished by causing chemical reactions to take place between reactive materials at the juncture between spaced electron conductors, which themselves may be such reactive materials, and an intermediately disposed ion containing and conducting medium to form a continuous energy exchange system. The reactive materials are separately supplied to each juncture so that the charge exchange of the reaction takes place ionically through the ion conductor forming an internal circuit and electronically through the electron conductor forming an external circuit. Thus, where the reactive materials are continuously supplied and an electrical load coupled to the external circuit it is possible to electro-chemically convert the energy of chemical reaction directly into electrical energy in the external circuit.

By way of example, where hydrogen is employed as one of the materials and oxygen as the other, the oxidation and reduction of each of these materials at the corresponding juncture between the electronic and ionic conductors generates electrical energy in the external circuit and produces water as a product of the reaction. When each of the materials is continuously supplied and consumed within such an apparatus, it may be likened, respectively, to a fuel, and to an antifuel, the former of which is selected to yield electrons in its chemical reaction and the latter of which is selected to accept electrons.

Normally, in any such apparatus, the fuel and the antifuel are supplied in a relatively stable condition and some means is required for activating their conversion from their normally stable reactant state to their reaction product state. It is believed that such conversion of the fuel and antifuel takes place by means of chemical adsorption to a chemisorbed state and desorption to their reaction product state at the corresponding junctures between the electron and ion conductors. Such conversion of the fuel and antifuel is not practically self-motivating and is therefore preferably enhanced by the introduction of some means which will promote adsorption at each juncture and some ionic means in the ion conducting medium which will promote desorption at each juncture. The reaction products may be removed from the apparatus in any convenient manner and preferably as they are formed.

For the purpose of this description the apparatus for accomplishing the direct conversion of chemical energy to electrical energy will be identified as a fuel cell. The electron conductors will be identified as electrodes and more specifically as the anode and cathode respectively depending upon whether they are on the fuel or antifuel side of the cell. The fuel will be identified throughout as any substance which is oxidizable relative to the antifuel which will in turn be identified as any substance which is reducible relative to the fuel; where oxidation and reduction, respectively, contemplate the release and acceptance of electrons.

A medium which is capable of conducting an electrical charge associated with an atom or group of atoms, i.e., ions, will be referred to as an ion-conducting medium. The ion-conducting medium serves to isolate the electronic conductors from each other in the internal circuit. The junctures between the electrodes and the ion-conducting medium will be identified throughout as interfaces. The activating means for promoting the conversion of the fuel and antifuel from their reactant state through the chemisorbed state to the reaction product state will be more specifically identified in conjunction with their functional coaction in the cell as an adsorber and a desorber. This overall reaction will be referred to as an electrochemical reaction.

It has been found advantageous in a low temperature (30° C.– 250° C.) fuel cell particularly where a hydrocarbon in the gaseous state is being used as the fuel, to employ an acidic ion conducting medium. While such a medium favors the electrochemical reaction which occurs at the electrode adapted to be contacted with a gaseous fuel, such a medium engenders with respect to the electrode adapted to contact a gaseous antifuel certain undesirable reactions. Notable among such undesirable reactions is the production of hydrogen peroxide which introduces losses in efficiency. A basic ion conducting medium obviates the difficulty of hydrogen peroxide formation at the antifuel electrode interface and is, therefore, the desirable medium to be used. However, a basic medium in contact with the electrode adapted to be contacted with a fuel engenders the formation of carbonates and attendant losses in efficiency by virtue thereof.

In order to secure the benefits of ion conducting media which are best suited to the respective fuel and antifuel reactions, it has been found advantageous to employ a divided cell containing chemically incompatible ion conducting media most favorably suited to the fuel and antifuel electrochemical reactions, respectively, and to maintain these incompatible media separate by the interposition of a barrier. One method of accomplishing the desired result is to employ an ion permeable membrane such as an ion exchange resin barrier, which permits the transfer of the charge within the internal circuit by means of ions which can permeate the ion exchange resin. However, this permits diffusive intermixing of the ion conducting media and cell efficiency is materially reduced because of the inability to utilize the energy of combination of the chemically incompatible media which is lost as heat.

In contradistinction to this type of barrier, the present invention contemplates an ion impermeable barrier separating the chemically incompatible ion containing and conducting media. Shunting means are provided around the barrier to couple the fuel derived ions and the antifuel derived ions from each medium, respectively, for electrochemical reaction at the interface between the barrier and but one of said media. Such an arrangement coacts pursuant to this invention to convert the energy of combination at the interface where the reaction occurs to electrical energy which is utilized in the overall electrochemical reaction to increase its efficiency of conversion.

Illustrative forms of this invention are shown in the annexed drawings in which.

Briefly stated, then, the present invention is in an electrochemical reaction apparatus having spaced electrodes adapted to be exposed to chemical reactants, for example, a fuel and an antifuel. In contact with the electrodes, respectively, are normally chemically incompatible ion conducting media each of which is adapted to include ions derived from such chemical reactants, e.g., derived respectively from the fuel and the antifuel. In order to prevent chemical interaction between the chemically incompatible ion conducting media, there is provided an ion impermeable barrier means, and in order to complete the internal circuit, shunting means coacting with the barrier are provided to couple the derived ions, such as the fuel derived ions and the antifuel derived ions for chemical reaction at the interface which exists between the barrier and but one of said media. By such a structure, then, it is possible to secure the advantages of conducting the electrochemical reactions in the medium favorable thereto; for example, with respect to the fuel, in a medium which favors that reaction; and with respect to the antifuel, in a medium which favors that reaction. The net result of such operation is greater efficiency. Although the principles of this invention are more broadly applicable as indicated above, they will, for exemplary purposes, be discussed below in reference to a fuel cell.

Figure 1:
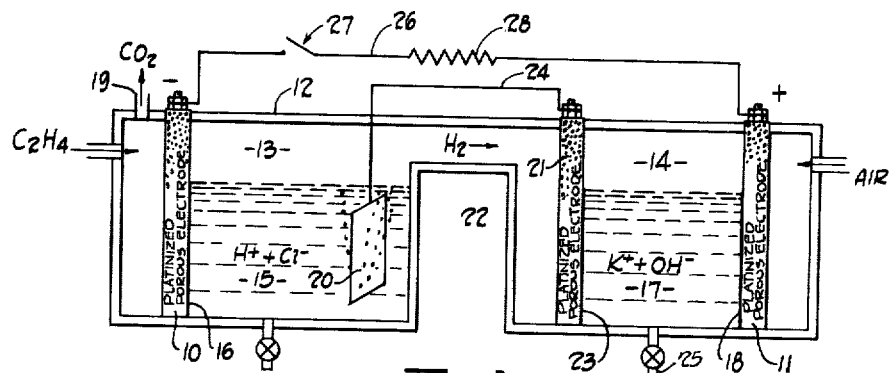
FIG. 1 is a diagrammatic representation of one form of apparatus embodying the principles of the present invention.

Referring now more particularly to the drawings, there is illustrated in diagrammatic form in FIG. 1 a divided cell having spaced apart electrodes 10 and 11, electrode 10 being adapted to be contacted with a fuel which, for exemplary purposes, may be a hydrocarbon such as ethane. The electrode 11 is adapted to be contacted with an antifuel which, for exemplary purposes, may be an oxygen containing gas such as air. Electrodes 10 and 11 are conveniently porous graphite electrodes having platinum or some other noble metal deposited on the surface thereof in the "black" form, or in the foramina of the electrode as an adsorber. The spaced electrodes 10 and 11 are conveniently disposed in a divided container of non-conducting material 12, such as glass, and defining a "fuel" side 13 and an "antifuel" side 14. Disposed in the fuel side 13 is an aqueous ion containing and conducting medium which, in the device illustrated, is preferably acidic such as, for example, an aqueous hydrochloric acid solution providing a medium favorable to the desorption of ions from the interface. The juncture of this ion containing and conducting medium 15 with the fuel electrode 10 defines an interface 16. The antifuel side 14 of the cell has disposed therein an aqueous basic ion containing and conducting medium 17, and the juncture thereof with the antifuel electrode 11 defines interface 18. As indicated above, the acidic medium 15 favors the conversion of the hydrocarbon fuel, for example, ethane, at the interface 16 with the production of hydrogen ions at the interface 16 and the exhausting of carbon dioxide through an outlet 19, as diagrammatically shown in FIG. 1. The basic ion containing and conducting medium 17 favors the electrochemical conversion at the interface 18 of the oxygen in the antifuel to hydroxyl ions without the formation of undue amounts of hydrogen peroxide which impair the efficiency of the cell.

In order to couple the fuel derived ions and the antifuel derived ions for electrochemical reaction, shunting means are provided for converting the hydrogen ions, the fuel derived ions contained in the ion containing and conducting medium 15, into hydrogen gas at an auxiliary electrode 20. The conversion of the hydrogen ions into gas involves the taking up of an electron for each atom of hydrogen at the auxiliary electrode 20 which because of the metallic nature thereof has an excess of electrons associated with metal atoms, and which is in electronic communication with a second auxiliary electrode 21 which may conveniently have the same physical structure as the fuel electrode 10; i.e., a porous, or foraminous conducting material, such as, porous carbon desirably having deposited on the surface thereof, or in the foramina, a noble metal such as platinum in finely divided or "black" form. The hydrogen gas released at the surface of the auxiliary electrode 20 passes across the barrier 22, and becomes in effect a fuel for the usual hydrox type cell composed of auxiliary electrode 21 and antifuel electrode 11 but for the fact that electrode 21 is not connected to the external circuit. The electrode 21 is in contact with the ion conducting and containing medium 17 which, as indicated above is basic. Since there is no carbon associated with the hydrogen being fed to the electrode 21, it is possible to use a basic ion conducting and containing medium. The juncture between the ion containing and conducting medium 17 and the electrode 21 is interface 23. Due to the catalytic effect of the platinum, or other such noble metal deposited on the surface of the electrode 21, hydrogen is readily adsorbed thereon to a chemisorbed state. At the interface between the ion containing and conducting medium 17 and the electrode 21, the chemisorbed hydrogen is desorbed, giving up an electron to the auxiliary electrode circuit 24 and thereby reconstituting the hydrogen in the ionic form and thus available for reaction with the hydroxyl ions formed at the antifuel electrode 11 interface 18 under the favorable influence of a basic ion containing and conducting medium 17. The product of the cell reaction, water, may be intermittently exhausted through the valved outlet 25. The ionic reactions which have been described herein take place on closing the switch 27 in the external circuit 26 containing a load 28.

Figure 2:
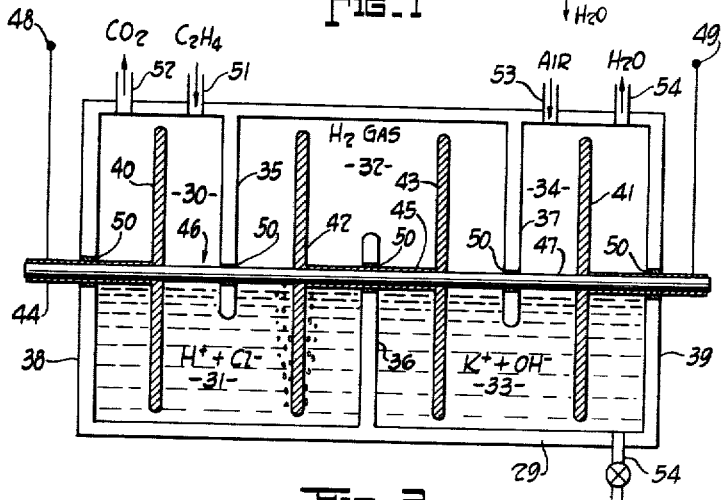
FIG. 2 is a diagrammatic illustration of another form of apparatus comprising a fuel cell employing rotating electrodes and embodying the principles of the present invention.

Referring now more particularly to FIGURE 2, a different form of the invention embodied in the apparatus described in FIG. 1 is shown. The characterizing feature of the apparatus of FIG. 2 is that the electrodes are only partially submerged in the ion containing media and are rotatably supported therein to exchange the effective working area of the electrodes between the gas and liquid phases of the cell to minimize concentration polarization.

In FIG. 2 there is provided a water-tight container 29 made of any suitable non-conducting material; e.g., glass, hard rubber, nylon, polyethylene, fiber glass reinforced polyester resins, etc. The interior of the container 29 is divided into a plurality of compartments 30, 31, 32, 33, and 34 by means of wall segments 35 and 37, depending from the topmost portion of the container 29, and wall segment 36 extending from the bottom of the container 29. The wall segments partially extending across the cell body 29 in combination with the ion containing and conducting media carried in compartments 31 and 33 isolate compartments 30, 32 and 34 from each other, and the wall section 36 extending above the level of the ion conducting and containing media in compartments 31 and 33 serves to isolate the respective media from each other. An axle 44 is suitably bearinged for rotation in end walls 38 and 39 of the container 29, the depending wall segments 35 and 37, and upperly extending wall segment 36. Mounted for rotation on the axle 44 is an electrically conductive electrode 40 which is adapted to be exposed to a fuel such as, for example, a hydrocarbon; e.g., methane, water gas, ethane, propane, butane, or mixtures of various gaseous fuels, etc. The electrode 40 is in contact with both the chambers 30 and 31, but insulated from electrical contact with all other electrodes in the apparatus, and the walls of the container. Electrode 40 is provided with an axle sleeve 40a of electrically conducting material for connection to the external circuit load not shown. Another electrically conducted electrode 41 is also mounted on the axle 44 for rotation, and is in contact with chambers 41 and 33.

Electrode 41, which may be made of any suitable electrically conducting material, is adapted to be in contact with an anti-fuel in chamber 41 and is maintained out of electrical contact with all of the other electrodes in the system, and in the side walls of the container. Electrode 41 has also an axle sleeve 41a similar in purpose and operation to sleeve 40a.

There is also provided a pair of auxiliary electrodes 42 and 43, likewise mounted on the axle 44, the electrodes 42 and 43 being in electrical contact with each other as by a conducting sleeve portion 45 surrounding the axle 44. Axle portions 46 and 47 are free of electrically conducting material. It will be found convenient to make the axle 44 entirely of a non-conducting material such as nylon and utilize the metallic sleeves suitably keyed to axle 44 for rotation therewith to provide for electrical conductivity where necessary.

Auxiliary electrodes 43 and 42 are disposed on opposite sides of the upstanding barrier 36, and both in communication with chamber 32. Auxiliary electrode 42, however, is in contact with the ion conducting and containing medium disposed in chamber 31, and auxiliary electrode 43 is in contact with the ion conducting and containing medium disposed in chamber 33. Suitable bearing means 50, such as nylon bearing insert, are provided in the end walls 38 and 39, the depending wall portions 35 and 37, and the upstanding wall segment 36. All such bearings are in axial alignment and adapted to receive the axle 44 for rotation of the electrodes 40, 41, 42 and 43. Electrodes 40, 41, 42 and 43 are conveniently steel discs having platinum black deposited on the surfaces thereof.

The fuel chamber 30 is provided with an inlet 51 through which a gaseous fuel, such as a normally gaseous or vaporized normally liquid hydrocarbon may be introduced. The chamber 30 is also provided with an exhaust vent 52 through which are exhausted the products of combustion. In the case of a hydrocarbon fuel such as ethane, a product of combustion or oxidation is carbon dioxide.

When the fuel is hydrocarbon, it has been found desirable from the standpoint of the electromechanical reaction which is involved and also from the standpoint of the build up of carbon dioxide in the ion conducting and containing medium, to employ an acidic ion conducting and containing medium, such as, an aqueous solution of hydrochloric acid. Carbon dioxide, a product of the oxidation reaction taking place at the electrode 40, is insoluble in an acidic medium 31 and readily exhausted through the vent 52.

On the opposite side of the cell, a relatively reducible material is supplied as an antifuel, and in the particular case illustrated in FIG. 2, air containing free oxygen or any other oxygen containing gas is conveniently employed as the antifuel. Accordingly, the chamber 34 is provided with an air inlet duct 53. The product of the reaction of reduction occurring primarily at the electrode 41 is water. If the temperature of operation of the cell is sufficiently high to cause vaporization of the water, a vent 54 may be supplied for purpose of removal of exhaust water vapor. Otherwise, a valved conduit 54 in the bottom of the container may be provided for this purpose. The reduction of the antifuel is favored by a basic ion conducting and containing medium, as distinguished from an acidic medium. One of the reasons for this preference being the minimization of the formation of hydrogen peroxide at the antifuel electrode ion conducting medium interface.

In operation, the hydrocarbon gas becomes readily adsorbed on the surface of the rotating electrode 40 and is carried down into the acidic ion conducting and containing medium having, for example, hydrogen and chlorine ions in aqueous solution. When the terminals 48 and 49 are connected across an external load, an oxidation reaction occurs at the interface between the submerged portion of the rotating electrode 40 having the fuel adsorbed thereon and the ion containing and conducting medium. The result of this oxidation reaction (which may proceed in a step-wise fashion) is the yielding up of hydrogen ions to the solution, and electrons to the external circuit with the attendant production of carbon dioxide as an exhaust or by-product material. The concentration of the hydrogen ion therefore increases in the vicinity of the electrode 40 causing a drift or migration thereof toward auxiliary electrode 42. The presence of available electrons at the metal surface enables the hydrogen ions coming in contact with the auxiliary electrode 42 to accept a neutralizing electron pass from the atomic to the molecular hydrogen state and ultimately be carried out of the acidic ion containing and conducting medium 31 into the hydrogen chamber 32 where hydrogen gas is released from the surface of the electrode again because of the concentration effect, thereby increasing the concentration within the chamber 32. Auxiliary electrode 43 also in contact with the hydrogen gas accepts the hydrogen in an adsorbed state and carries it down into the basic ion containing and conducting medium, such as a potassium hydroxide in aqueous solution, where it undergoes electrochemical reaction with hydroxyl ions derived from the antifuel and carried in the ion containing and conducting medium in chamber 33. The product of this reaction is water, and as indicated above, may either be exhausted in the vapor state or periodically drained from the bottom of the container. The antifuel or oxygen containing gas is continuously fed to the exposed surface of antifuel electrode 41, becoming adsorbed thereon and carried down into the basic ion containing and conducting medium in chamber 33. By a process of desorption from the chemisorbed state, hydroxyl ions are derived from the antifuel by reaction with water, an electron provided from the external circuit and carried into solution as the hydroxyl ion. As the concentration of hydroxyl ions builds up in the vicinity of the rotating electrode 41, the movement of the hydroxyl ions is in the direction of the electrode 43. The hydrogen re-ionizing at the interface between the ion containing and conducting medium carried in vessel 33 releases an electron to the auxiliary electrode 43 which is conducted by means of the conducting sleeve 45 to the auxiliary electrode 42 to replace the electron accepted by the positive hydrogen ion in chamber 31.

The auxiliary electrodes 42 and 43, in combination with the hydrogen gas chamber 32 provide, therefore, a shunting structure which coacts with the the two chemically incompatible ion containing and conducting media disposed in chambers 31 and 33 respectively to couple the hydrogen ions derived from the hydrocarbon fuel and the hydroxyl ions derived from the antifuel for electrochemical reaction at the interface between the auxiliary electrode 43 and the basic ion conducting and containing medium disposed in chamber 33, i.e., the medium including the antifuel derived ions. Since the antifuel derived ions are not volatile as are the neutralized hydrogen ions derived from the fuel, the electrochemical reaction takes place in the medium containing the ions which do not volatilize upon neutralization of their charge. The upstanding wall, 36, serves to prevent the chemically incompatible ion containing and conducting media from interacting. In this manner, the internal circuit of the fuel cell is completed without the limitations imposed by an ion permeable barrier such as an ion exchange resin. Direct utilization of hydrocarbon fuels in a low temperature fuel cell is obtained. An easily disposed of and harmless gas, carbon dioxide is evolved at the hydrocarbon electrode, and the oxygen or antifuel electrode reaction is reversible as are the reactions occurring at the other electrodes in the cell. Therefore, the cell is highly efficient.

Figure 3:
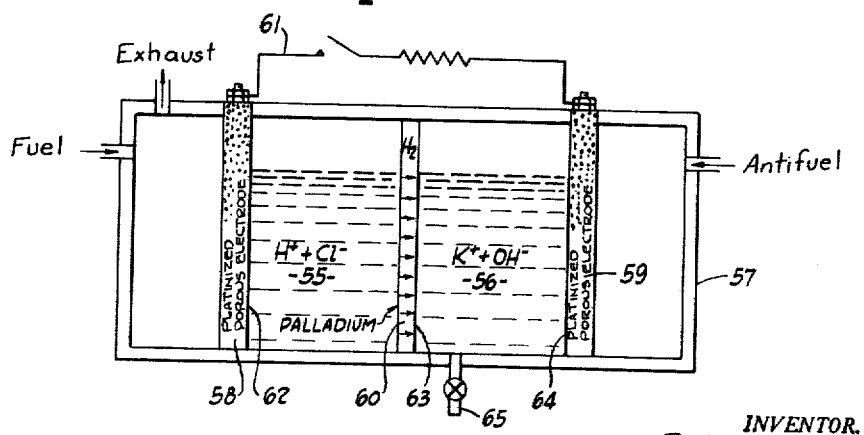
FIG. 3 is another form of apparatus shown in diagrammatic form and embodying the principles of the present invention.

FIG. 3 shows another modification of a cell which embodies the principle of a shunting means in the internal circuit whereby an ion derived from either the fuel or the antifuel is deprived of its charge which is moved by an electronic conductor to constitute the derived ion in the elemental state, is transported as a neutralized ion in the elemental state to the opposite side of the barrier, and the neutralized ion is reconstituted as a solution for electrochemical reaction with the ion which forms the other portion of the redox couple. In the embodiment shown in FIG. 3, a palladium metal foil is used as the ion impermeable barrier means which maintains the chemically incompatible ion conducting and containing media disposed in chambers 55 and 56, respectively, out of physical contact and therefore unable to react chemically. There is provided as diagrammatically shown in FIG. 3, a cell body 57 preferably constructed of a dielectric material; e.g., glass, plastic, hard rubber, ceramic, or the like having an electrode 58 adapted to be exposed to a hydrocarbon fuel, such as ethane, and an electrode 59 adapted to be exposed to an antifuel such as air containing free oxygen. The electrodes 58 and 59 may be of any conventional material such as, for example, porous graphite, having deposited on the surface thereof or in the foramina thereof a noble metal, such as platinum or palladium in finely divided or black form. Intermediate the electrodes 59 there is provided an ion-impermeable barrier 60 which may conveniently take the form of a palladium foil, unsupported, or supported upon a very porous inert ceramic material. Palladium has a peculiar property of being permeable to hydrogen atoms. At the same time, palladium is inactive to aqueous solutions of acids and bases. Intermediate the barrier 60 and the electrode 58 in the compartment defined by the walls of the vessel and the barrier 60 and the electrode 58 is disposed an ion conducting and containing medium such as an aqueous hydrochloric acid solution containing hydrogen and chlorine ions, respectively. In the chamber 56 defined by the barrier 60 and the antifuel electrode 59, there is contained an aqueous solution of potassium hydroxide as the ion containing and conducting medium. These media serve the same function as ascribed to them in FIGS. 1 and 2 above. In the same manner as previously indicated, the hydrocarbon fuel passes through the porous electrode 58, contacting the interface between the active metal surface and the ion containing and conducting medium whereby virtue of electrochemical reaction the fuel is oxidized yielding up hydrogen ions to the ion containing and conducting medium, carbon dioxide as a by-product, and electrons to the external circuit 61. As the concentration of the hydrogen ions increases in the vicinity of the interface 62, the hydrogen ions move toward the palladium barrier 60. Upon contacting the surface of the palladium barrier 60, the hydrogen ions accept the freely available electrons at the surface of the metal, become neutralized to the atomic state, and due to the concentration forces, pass quite easily through the palladium to the interface 63, where they are reconverted to the ionic state by electrochemical reaction, giving up an electron to the palladium metal for each atom of hydrogen to replace the electron accepted by such atom of hydrogen, in the ionized state, therefore, the hydrogen ions are capable of reacting with the hydroxyl ions derived from the antifuel by electrochemical reaction at the interface 64 between the antifuel electrode 59 and the ion containing and conducting medium disposed in chamber 56. Water, the product of the reaction in chamber 56 may be exhausted intermittently through valve conduit 65.

There has thus been provided in a fuel cell structure which enables the use of chemically reactive ion containing and conducting media, respectively favoring the interfacial electrochemical reactions of the fuel and antifuel electrodes. By shunting the charge on an ion, and the neutralized ion across a physical, ion-impermeable barrier, and reionizing the neutralized ion, all apart from the efficiency reducing factors of the source of the ion, greater efficiency of fuel and antifuel conversion to useful electrical energy can be achieved.

Other modes of applying the principle of this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. In an electrochemical reaction apparatus having spaced electrodes adapted to be exposed respectively to a fuel and an antifuel, a pair of chemically incompatible ion conducting media independently disposed in the space between said electrodes, one of said ion conducting media adapted to desorb ions derived from said fuel and the other of said ion conducting media adapted to desorb ions derived from said antifuel, ion impermeable barrier means operably disposed between said pair of ion conducting media to isolate said media from each other and thereby prevent chemical interaction therebetween, and shunting means coacting between said pair of ion conducting media and across said barrier means to transfer the ions from one of said media to the other for electrochemical reaction at the interface between said barrier means and said other medium while maintaining said media isolated from each other.

2. In an electrochemical reaction apparatus having spaced electrodes adapted to be exposed respectively to a fuel and an antifuel, a pair of chemically incompatible ion conducting media independently disposed in the space between said electrodes, one of said ion conducting media adapted to desorb ions derived from said fuel and the other of said ion conducting media adapted to desorb ions derived from said antifuel, ion permeable barrier means operably disposed between said pair of ion conducting media to isolate said media from each other and thereby prevent chemical interaction therebetween, and shunting means including electron conducting means coacting between said barrier and the medium having the fuel derived ions to electrically neutralize said fuel ions thereat, and means coacting therewith for transporting said neutralized fuel ions across said barrier for electrochemical combination with said antifuel derived ions at the interface between said barrier and the medium having the antifuel ions while maintaining said media isolated from each other.

3. The electrochemical reaction apparatus of claim 2 wherein said fuel includes hydrogen and said ion permeable barrier means is a metallic member permeable to hydrogen.

4. The electrochemical reaction apparatus of claim 2 in which the ion permeable metallic barrier is palladium.

5. The electrochemical reaction apparatus of claim 2 wherein the ion conducting medium adapted to desorb ions derived from said fuel is acidic and the ion conducting medium adapted to desorb ions derived from said antifuel is basic.

6. The electrochemical reaction apparatus of claim 2 wherein the shunting means includes a pair of auxiliary electrodes operatively disposed respectively in each of said ion conducting media, said electrodes being electronically coupled together and coacting between said media to couple said fuel derived ions and antifuel derived ions for electrochemical reaction at the interface between one of said auxiliary electrodes and said other ion conducting medium.

7. In an electrochemical reaction apparatus having a compartmented fuel cell body, a rotatable electrode adapted to be exposed to a fuel including hydrogen disposed in one of said compartments, a rotatable electrode adapted to be exposed to an antifuel in another of said compartments, chemically incompatible ion conducting media disposed respectively in each of said compartments partially covering the corresponding electrodes, the ion conducting medium partially covering the electrode adapted to be exposed to a fuel being adapted to desorb ions derived from said fuel, and the ion conducting medium partially covering the electrode adapted to be exposed to an antifuel being adapted to desorb ions derived from said antifuel, a pair of auxiliary rotatable electrodes electronically coupled together and each partially immersed in one of said media respectively, and means for conveying hydrogen gas released at one of said auxiliary electrodes to the other of said auxiliary electrodes for electrochemical reaction at the interface between the other of said auxiliary electrodes and the medium including ions derived from said antifuel.

8. The method of electrochemically combining in a single ion-containing and conducting medium an ion derived from a fuel in a first ion-containing and conducting medium with an ion derived from an antifuel in a second ion-containing and conducting medium, said second ion-containing and conducting medium being chemically reactive with said first medium, which comprises the steps of:

(a) isolating the first and second ion-containing and conducting media to prevent chemical interaction therebetween, (b) neutralizing the charge on the ions in one of said media at a charge conducting interface disposed in one of said media, (c) electrically conducting said charge to a second charge conducting interface disposed in said second medium, (d) simultaneously transporting said neutralized ions to the second charge conducting interface, and (e) combining the transported neutralized ions with the conducted charges at the second interface for electrochemical reaction thereat with the ions in said second medium.

9. In an electrochemical reaction apparatus having a compartmented fuel cell body, an electrode adapted to be exposed to a fuel disposed in one of said compartments, an electrode adapted to be exposed to an antifuel disposed in another of said compartments, chemically incompatible ion conducting media disposed respectively in each of said compartments, and each adapted to contain, respectively, ions derived from said fuel, and ions derived from said antifuel, and shunting means including a pair of auxiliary electrodes disposed respectively in each of said compartments and electronically coupled together and coacting between said compartments to couple said fuel derived ions and antifuel derived ions for electrochemical reaction at the interface between one of said auxiliary electrodes and the medium in which it is disposed.

References Cited in the file of this patent

UNITED STATES PATENTS

| | | |
|---|---|---|
| 268,174 | Blanchard | Nov. 28, 1882 |
| 699,414 | Reed | May 6, 1902 |
| 809,089 | Blackmore | Jan. 2, 1906 |
| 2,901,522 | Bopp | Aug. 25, 1959 |

FOREIGN PATENTS

| | | |
|---|---|---|
| 643,098 | Great Britain | Sept. 15, 1950 |
| 152,364 | Great Britain | Feb. 14, 1922 |

OTHER REFERENCES

Status Report on Fuel Cells ARO Report No. 1, PB 151804, June 1959, pages 20, 60–64.

UNITED STATES PATENT OFFICE
CERTIFICATE OF CORRECTION

Patent No. 3,092,516 June 4, 1963

Robert A. Rightmire

It is hereby certified that error appears in the above numbered patent requiring correction and that the said Letters Patent should read as corrected below.

Column 8, line 31, for "permeable" read -- impermeable --.

Signed and sealed this 15th day of December 1964.

(SEAL)
Attest:

ERNEST W. SWIDER
Attesting Officer

EDWARD J. BRENNER
Commissioner of Patents